US011632186B2

(12) United States Patent
Gotman et al.

(10) Patent No.: US 11,632,186 B2
(45) Date of Patent: Apr. 18, 2023

(54) METHODS AND SYSTEMS FOR CAPTURING SIGNALS IN ACCORDANCE WITH ALLOCATED RESOURCES

(71) Applicant: MOTOROLA SOLUTIONS, INC., Chicago, IL (US)

(72) Inventors: Rony Gotman, Tel Aviv-Yaffo (IL); Baruh Hason, Tel Aviv-Yaffo (IL); Guy Holtzman, Tel Aviv (IL); Gabi Ofir, Reshon Letzion (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 497 days.

(21) Appl. No.: 15/394,150

(22) Filed: Dec. 29, 2016

(65) Prior Publication Data

US 2018/0192413 A1    Jul. 5, 2018

(51) Int. Cl.
*H04K 3/00* (2006.01)
*H04W 12/02* (2009.01)
(Continued)

(52) U.S. Cl.
CPC ............ *H04K 3/226* (2013.01); *H04W 12/02* (2013.01); *H04W 72/042* (2013.01); *H04W 48/08* (2013.01)

(58) Field of Classification Search
None
See application file for complete search history.

(56) References Cited

U.S. PATENT DOCUMENTS 9,326,303 B2   4/2016  Ji et al.
9,363,702 B2   6/2016  He et al.
(Continued)

FOREIGN PATENT DOCUMENTS

WO   2013091229        6/2013
WO   2014189782        11/2014
WO   2015141715 A1    9/2015

OTHER PUBLICATIONS

Combined Search and Examination Report from the Intellectual Property Office of Great Britain for Application No. 1720226.8 dated Jun. 6, 2018 (4 pages).
Peng et al, "Interference avoidance mechanisms in the hybrid cellular and device-to-device systems," IEEE 20th International Symposium on Personal, Indoor and Mobile Radio Communications (PIMRC 2009), Sep. 13, 2009, pp. 617-621.
(Continued)

*Primary Examiner* — Yaotang Wang
(74) *Attorney, Agent, or Firm* — Michael Best & Friedrich LLP

(57) ABSTRACT

Method and system for capturing signals in accordance with allocated resources. One method includes receiving, from a server by a network interface of a first communication device located in a cell, identification information of a second communication device located in the cell. The method further includes receiving, from a base station by the network interface of the first communication device, a resource allocation message destined for the second communication device. The resource allocation message indicates a resource allocation for the second communication device on an uplink channel of the base station. The method further includes decoding, by an electronic processor of the first communication device, the resource allocation message using the identification information of the second communication device. The method further includes capturing, by the network interface of the first communication device, signals based on the resource allocation for the second communication device.

15 Claims, 8 Drawing Sheets

(51) Int. Cl.
*H04W 72/04* (2009.01)
*H04W 48/08* (2009.01)

(56) References Cited

U.S. PATENT DOCUMENTS

| | | | |
|---|---|---|---|
| 2010/0240312 | A1 | 9/2010 | Peng et al. |
| 2012/0182878 | A1* | 7/2012 | Qian .................... H04B 7/155 |
| | | | 370/242 |
| 2014/0086152 | A1 | 3/2014 | Bontu et al. |
| 2015/0055567 | A1* | 2/2015 | Narasimha ............ H04W 76/14 |
| | | | 370/329 |
| 2016/0128064 | A1 | 5/2016 | Su et al. |
| 2016/0337408 | A1* | 11/2016 | Lin ....................... H04W 12/02 |
| 2017/0099658 | A1 | 4/2017 | Shattil |
| 2017/0230941 | A1* | 8/2017 | Agiwal ................. H04W 72/04 |
| 2017/0265018 | A1* | 9/2017 | Mok ....................... H04W 4/70 |

OTHER PUBLICATIONS

German Patent Office Action for Application No. 102017130127.5 dated Feb. 22, 2022 (13 pages, including English translation).

* cited by examiner

METHODS AND SYSTEMS FOR CAPTURING SIGNALS IN ACCORDANCE WITH ALLOCATED RESOURCES

BACKGROUND OF THE INVENTION

Communication devices, for example, land mobile radios, smart phones, and the like, may communicate with each other through base stations that are responsible for allocating resources for communication. For example, a base station may allocate resources by scheduling communications for various communication devices at different times on different frequencies. In such communication systems, a transmitting device may transmit data wirelessly to the base station in accordance with resources allocated for the transmitting device, and the base station may route the data wirelessly to a receiving device in accordance with resources allocated for the receiving device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
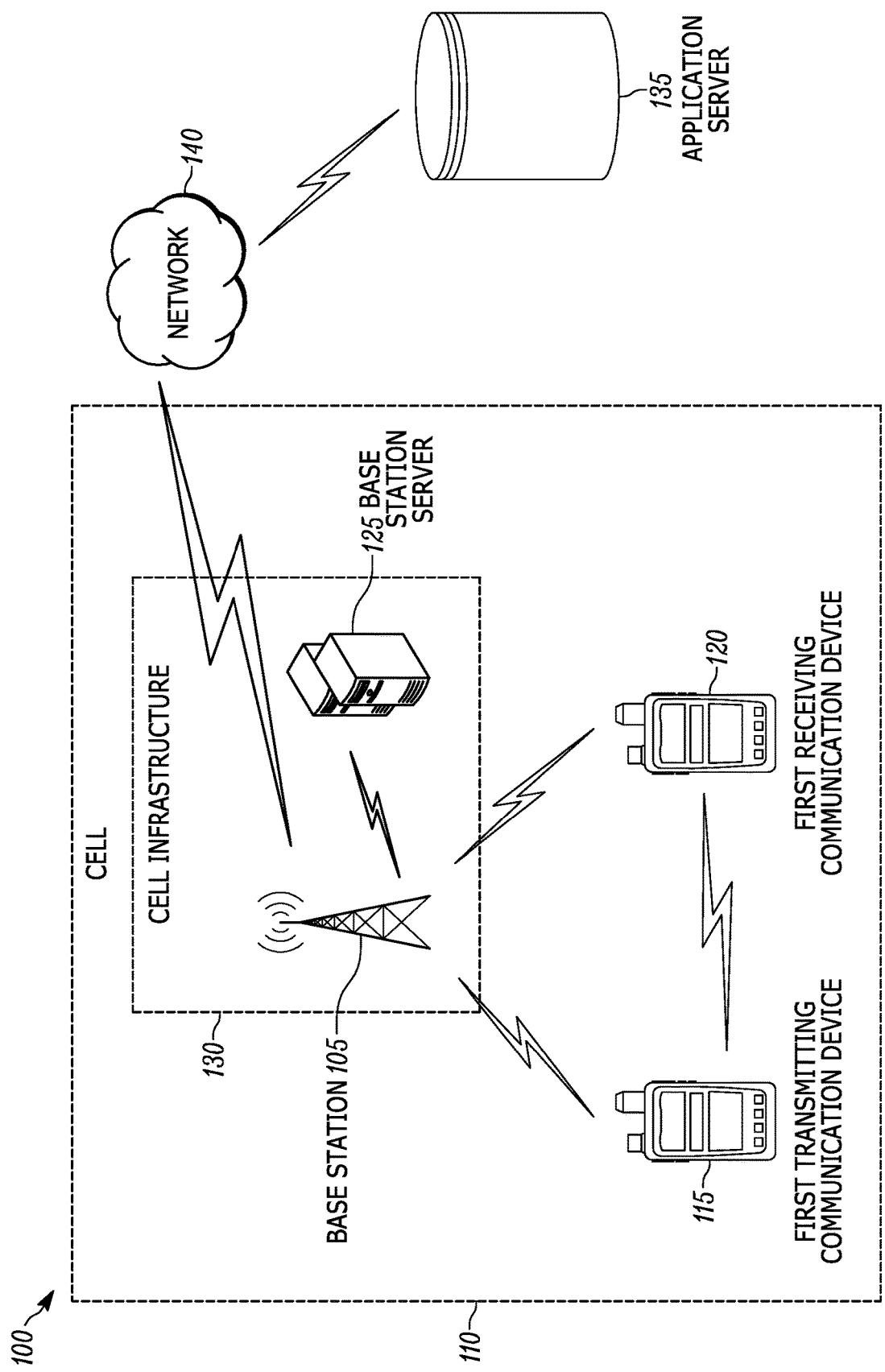
FIG. 1 is a diagram of a first communication system according to one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of capturing signals in accordance with allocated resources. The method includes receiving, from a server by a network interface of a first communication device located in a cell, identification information of a second communication device located in the cell. The method further includes receiving, from a base station by the network interface of the first communication device, a resource allocation message destined for the second communication device. The resource allocation message indicates a resource allocation for the second communication device on an uplink channel of the base station. The method further includes decoding, by an electronic processor of the first communication device, the resource allocation message using the identification information of the second communication device. The method further includes capturing, by the network interface of the first communication device, signals based on the resource allocation for the second communication device.

Another embodiment provides a first communication device located in a cell. The first communication device includes an electronic processor and a network interface. The first communication device is configured to receive, from a server by the network interface, identification information of a second communication device located in the cell. The first communication device is further configured to receive, from a base station by the network interface, a resource allocation message destined for the second communication device. The resource allocation message indicates a resource allocation for the second communication device on an uplink channel of the base station. The first communication device is further configured to decode, with the electronic processor, the resource allocation message using the identification information of the second communication device. The first communication device is further configured to capture, by the network interface, signals based on the resource allocation for the second communication device.

Another embodiment provides a communication system including a communication device including a first network interface. The communication system further includes a base station including a second network interface. The second network interface is coupled via a wired connection to the first network interface. The communication device is configured to request, via the first network interface from the base station, a resource allocation of an uplink channel of the base station. The communication device is further configured to receive, via the first network interface from the base station, the resource allocation of the uplink channel of the base station. The communication device is further configured to transmit first data via the first network interface through the base station and to a server. The first data corresponds to the resource allocation of the uplink channel, and the first data is stored on the server. The communication device is further configured to transmit second data via the first network interface through the base station and to the server such that the base station determines that the uplink channel is in use. The base station is configured to receive the first data from the server and transmit the first data to at least one other communication device.

FIG. 1 is a diagram of a first communication system 100 according to one exemplary embodiment. The first communication system 100 includes a base station 105 located in a cell 110. The base station 105 may include a transceiver to wirelessly communicate with communication devices located in the cell 110 (in other words, communication devices located within a predetermined distance from the base station 105). In the first communication system 100, the base station 105 wirelessly communicates with a first transmitting communication device 115 and a first receiving communication device 120 (for example, by sending and receiving radio signals using the transceiver). As indicated by FIG. 1, in some embodiments, the first transmitting communication device 115 and the first receiving communication device 120 wirelessly communicate directly with each other when they are within a predetermined distance from each other as explained in greater detail below.

The cell 110 shown in FIG. 1 is merely exemplary and is simplified for clarity purposes. In some embodiments, the cell 110 includes additional communication devices that may act as the first transmitting communication device 115 or the first receiving communication device 120. In some embodiments, the cell 110 includes multiple communication devices that receive data from the first transmitting communication device 115. In the following description, when explaining how a method of communicating between the communication devices within the cell 110 is implemented, references to the first transmitting communication device 115 and the first receiving communication device 120 are used. It is not necessary, however, that the communication devices 115 and 120 maintain these roles at all times. For example, in some embodiments, the first transmitting communication device 115 and the first receiving communication device 120 may switch roles such that the first transmitting communication device 115 receives data from the first receiving communication device 120 at a different point in time. In some embodiments, the communication device 115 and 120 may receive and transmit data at the same time (for example, when each communication device 115 and 120 is communicating with another communication device).

In some embodiments, the communication devices 115 and 120 are the same model of device. In other embodiments, the communication devices 115 and 120 are not the same model, but are capable of communicating over the same network or using the same communication methods. As illustrated in FIG. 1, the communication devices 115 and 120 may be handheld communication devices, for example, a mobile telephone or other portable communication device, mobile radio, smart watch or other smart wearable, drone, or other device configured to communicate with the base station 105. In some embodiments, at least one of the communication devices 115 and 120 may be a handheld radio carried by a public safety officer or first responder, such as a police officer. In other embodiments, at least one of the communication devices 115 and 120 may be a smart phone carried by a person for personal use. In some embodiments, at least one of the communication devices 115 and 120 may be a mobile communication device mounted in or on a vehicle (for example, a police vehicle). In some embodiments, at least one of the communication devices 115 and 120 may be a device maintained, for example, at a call center or public safety command center.

The base station 105 is coupled to a base station server 125 that together with the base station 105 may be referred to as cell infrastructure 130 of the cell 110. Although FIG. 1 shows the base station server 125 wirelessly coupled to the base station 105, in some embodiments, the base station server 125 is coupled to the base station 105 through a wired connection (for example, as shown in the exemplary embodiment of FIG. 2) or a combination of wired and wireless connections. The base station server 125 interprets signals received by the base station 105 from other devices and controls transmission of signals from the base station 105 to other devices. The base station 105 is operable to allocate resources, as described in further detail below. To allocate resources or otherwise manage communication to and from devices in the first communication system 100, the base station 105 may communicate with, be controlled by, and rely on processing performed by the base station server 125.

In addition to communicating with devices located within the cell 110, the base station 105 also communicates with devices and networks outside of the cell 110. In the example shown, the base station 105 communicates with an application server 135 through a network 140. In some embodiments, the application server 135 receives and stores identification information of the first transmitting communication device 115 in a database. The first receiving communication device 120 and other communication devices located in the cell 110 may retrieve the identification information of the first transmitting communication device 115 from the database of the application server 135 as explained in greater detail below.

In some embodiments, the base station 105 also communicates with other base stations through the network 140. The network 140 may be a wired or a wireless communication network. All or parts of the network 140 may be implemented using various existing networks, for example, a cellular network such as a Long Term Evolution (LTE) network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The network 140 may also include future developed networks. In some embodiments, the network 140 may also include a combination of the networks mentioned previously herein.

Figure 2:
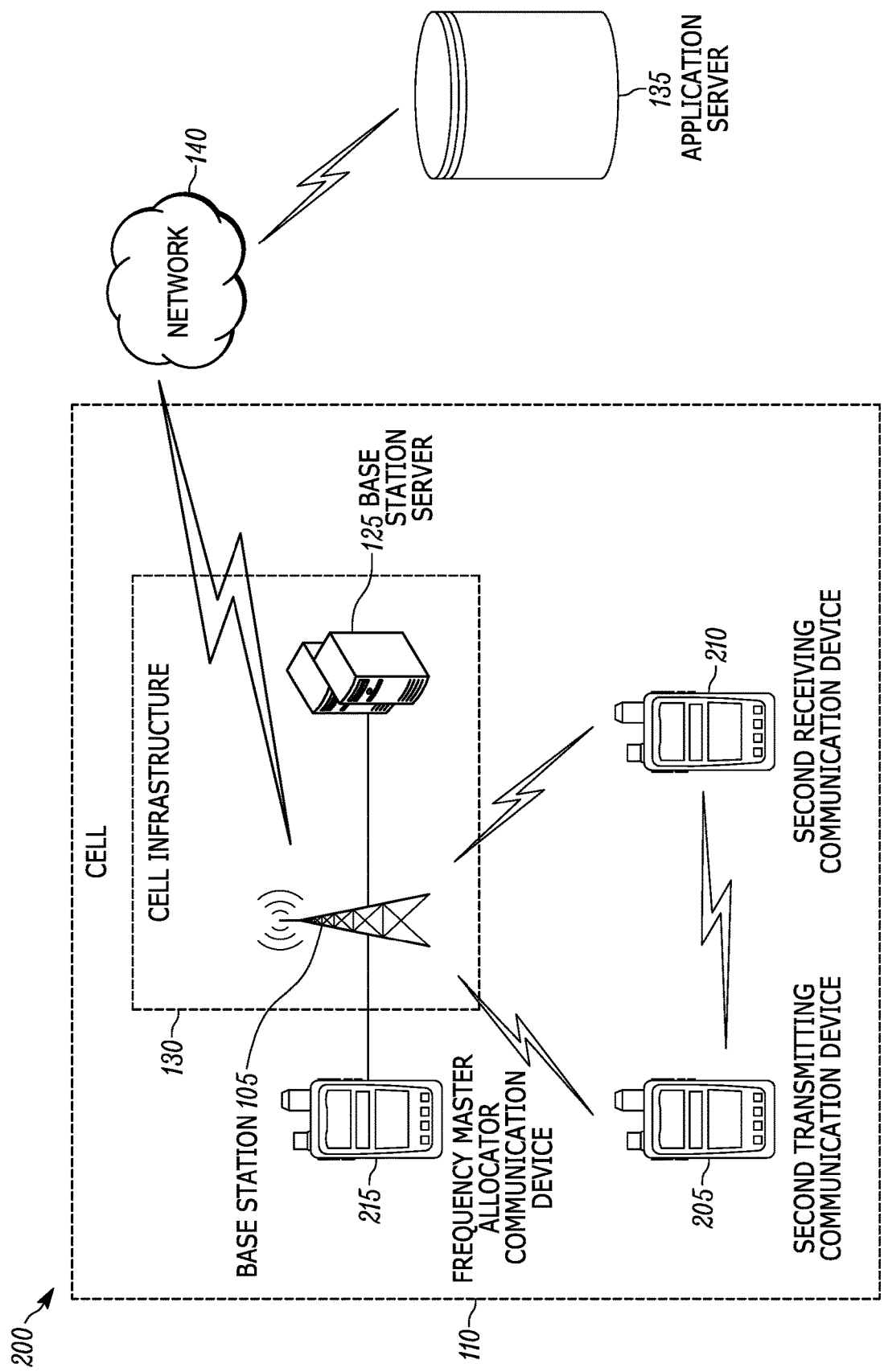
FIG. 2 is a diagram of a second communication system according to one embodiment.

FIG. 2 is a diagram of a second communication system 200 according to another exemplary embodiment. The second communication system 200 includes some components similar to those of the first communication system 100 of FIG. 1. For example, the second communication system 200 includes the cell 110 that includes the base station 105 and the base station server 125 that together may be referred to as the cell infrastructure 130. The second communication system 200 also includes the application server 135 that communicates with the base station 105 over the network 140. The explanations of the components as described previously herein with respect to FIG. 1 apply to the similarly-labeled components of FIG. 2.

The second communication system 200 also includes a second transmitting communication device 205, a second receiving communication device 210, and a frequency master allocator communication device 215 (herein referred to as master allocator 215). In some embodiments, the communication devices 205 and 210 are similar to the communication devices 115 and 120 described above with respect to the first communication system 100. In such embodiments, the explanations of the communication device 115 and 120 as described previously herein apply to the communication devices 205 and 210 (for example, the second transmitting communication device 205 and the second receiving communication device 210 may switch roles such that the second transmitting communication device 205 receives data from the second receiving communication device 210 at a different point in time).

In some embodiments, the master allocator 215 is similar to the communication devices 115, 120, 205, and 210. For example, the master allocator 215 may include similar components as the communication devices 115, 120, 205, and 210 as described in greater detail below.

As shown in FIG. 2, in some embodiments the master allocator 215 is coupled to the base station 105 through a wired connection. For example, an antenna of the master allocator 215 may be conducted to an antenna of the base station 105. In other words, a radio frequency interface of the master allocator 215 may be conducted to a radio frequency interface of the base station 105. In some embodiments, the master allocator 215 may be located inside a radio frequency shielded container to prevent wireless signals from entering or exiting the radio frequency shielded container.

In some embodiments, the master allocator 215 may communicate with the base station 105 through the wired connection. In turn, the base station 105 may communicate with the application server 135 over the network 140 as described previously herein. For example, the application server 135 may receive and store identification information of the master allocator 215 in a database. At least one of the second transmitting communication device 205, the second receiving communication device 210, and other communication devices located in the cell 110 may retrieve the identification information of the master allocator 215 from the database of the application server 135 as explained in greater detail below. In some embodiments, the master allocator 215 does not communicate wirelessly with the base station 105 or with any other device. In other words, in some embodiments, the master allocator 215 communicates solely through wired connections with the cell infrastructure 130 (for example, through mutually conducted antennas).

The communication systems 100 and 200 are merely exemplary and are simplified for clarity purposes. In some embodiments, the communication systems 100 and 200 include a plurality of cells that each include a base station. Each base station communicates with communication devices located within its respective cell to allocate resources for communication between the communication devices (in other words, each base station server manages communication to and from the communication devices by, for example, scheduling communications at different times on different frequencies). Each base station also communicates with other base stations over the network 140 to allow for communication between communication devices located in different cells.

Figure 3:
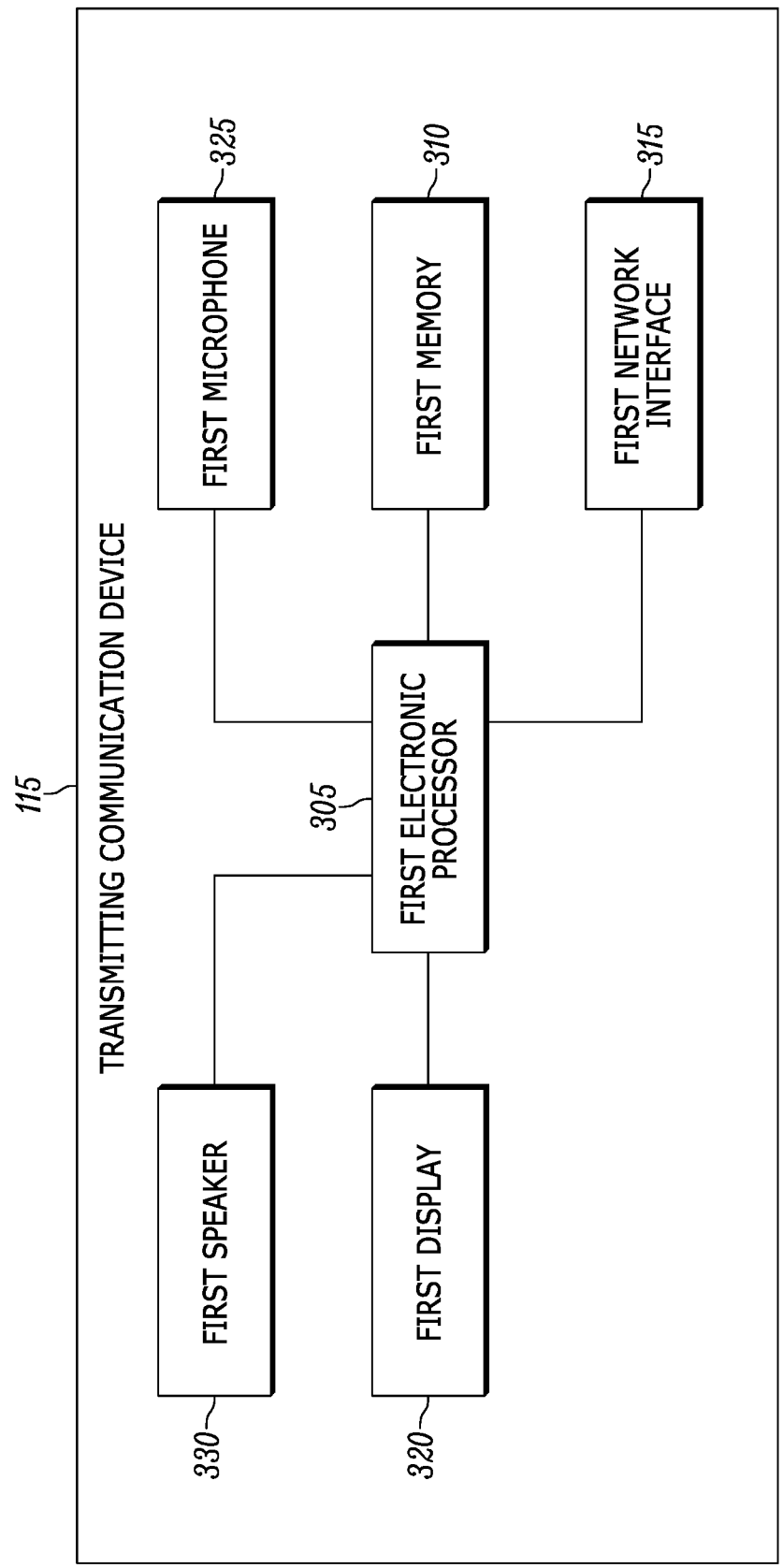
FIG. 3 is a diagram of a first transmitting communication device included in the first communication system of FIG. 1 according to one embodiment.

FIG. 3 is a diagram of the first transmitting communication device 115 of the first communication system 100 according to one embodiment. The first transmitting communication device 115 includes a first electronic processor 305 (for example, a microprocessor or another electronic device). The first electronic processor 305 may include input and output interfaces (not shown) and be electrically coupled to a first memory 310, a first network interface 315, a first display 320, a first microphone 325, and a first speaker 330. In some embodiments, the first transmitting communication device 115 may include fewer or additional components in configurations different from that illustrated in FIG. 3. For example, in some embodiments, the first transmitting communication device 115 also includes a camera and a location component (for example, a global positioning system receiver). In some embodiments, the first transmitting communication device 115 performs additional functionality than the functionality described below.

The first memory 310 includes read only memory (ROM), random access memory (RAM), other non-transitory computer-readable media, or a combination thereof. The first electronic processor 305 is configured to receive instructions and data from the first memory 310 and execute, among other things, the instructions. In particular, the first electronic processor 305 executes instructions stored in the first memory 310 to perform or control functionality of the first transmitting communication device 115 described herein.

The first network interface 315 sends and receives data to and from the base station 105. For example, the first network interface 315 may include a transceiver for wirelessly communicating with the base station 105 (for example, using radio signals). Alternatively or in addition, the first network interface 315 may include a connector or port for receiving a wired connection to the base station 105, such as an Ethernet cable, an antenna cable, or the like. The first electronic processor 305 receives electrical signals representing sound from the first microphone 325 and may communicate information relating to the electrical signals to the base station 105 through the first network interface 315, such as for receipt by another communication device. Similarly, the first electronic processor 305 may output data received from the base station 105 or another device through the first network interface 315, such as from another communication device, through an output device of the first transmitting communication device 115 such as the first speaker 330, the first display 320, or a combination thereof.

Figure 4:
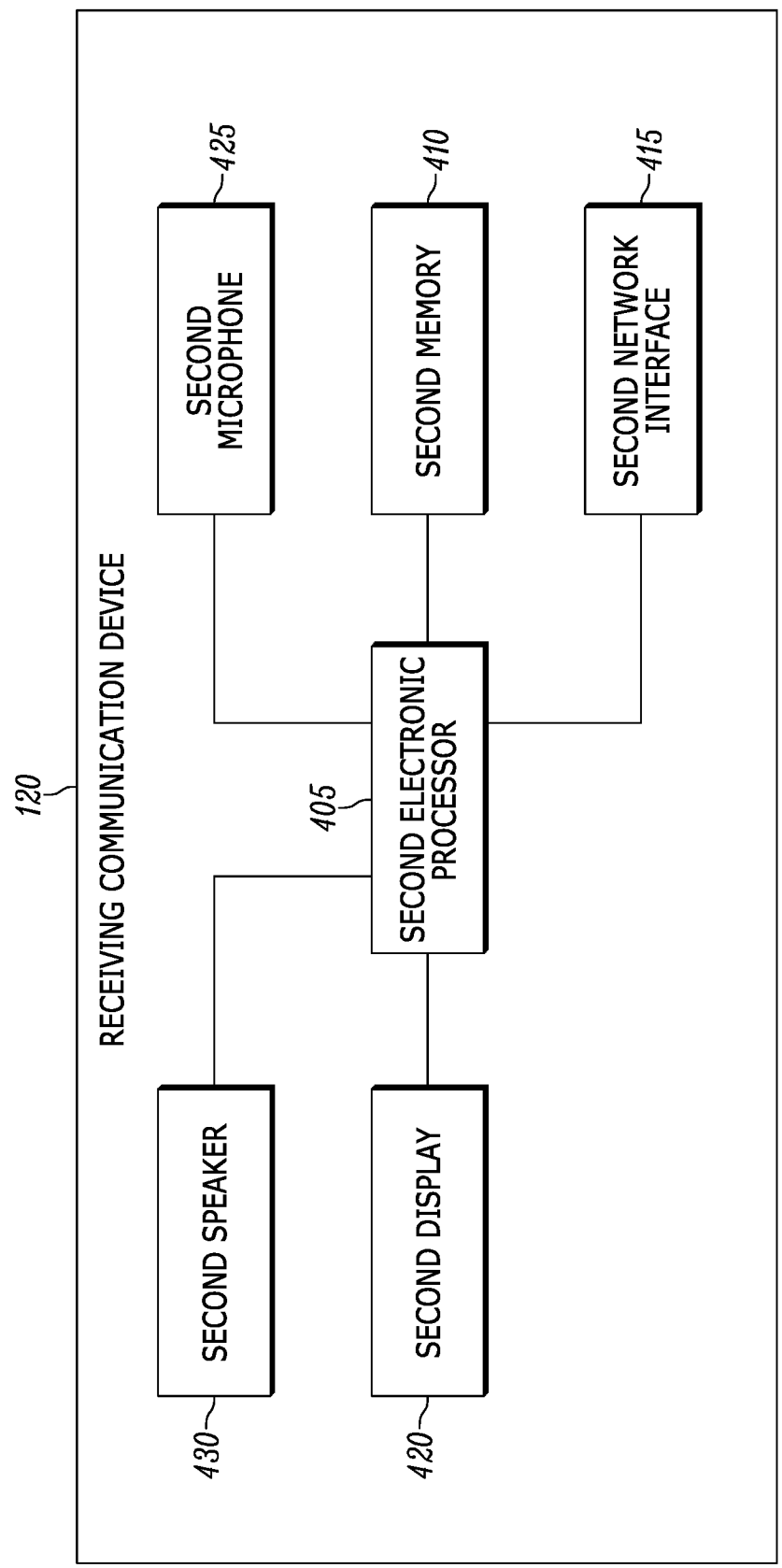
FIG. 4 is a diagram of a first receiving communication device included in the first communication system of FIG. 1 according to one embodiment.

FIG. 4 is a diagram of the first receiving communication device 120 of the first communication system 100 according to one embodiment. The first receiving communication device 120 includes a second electronic processor 405 electrically coupled to a second memory 410, a second network interface 415, a second display 420, a second microphone 425, and a second speaker 430. These components are similar to those described above with respect to the first transmitting communication device 115 and perform similar functions. In some embodiments, the first receiving communication device 120 may include fewer or additional components in configurations different from that illustrated in FIG. 4. For example, in some embodiments, the first receiving communication device 120 also includes a camera and a location component (for example, a global positioning system receiver). In some embodiments, the first receiving communication device 120 performs additional functionality than the functionality described below. Although the communication devices 115 and 120 shown in FIGS. 3 and 4 include similar components, in some embodiments, the communication devices 115 and 120 include different components and may be different types of communication devices.

With reference to the second communication system 200 of FIG. 2, in some embodiments, the second transmitting communication device 205 and the second receiving communication device 210 include similar components as described above with respect to the communication devices 115 and 120 (for example, an electronic processor, a memory, a network interface, a display, a microphone, and a speaker). The explanations of the components of the communication devices 115 and 120 as described above apply similarly to the communication devices 205 and 210 (for example, the communication devices 205 and 210 may include fewer or additional components in configurations different from that illustrated in FIGS. 3 and 4).

Figure 5:
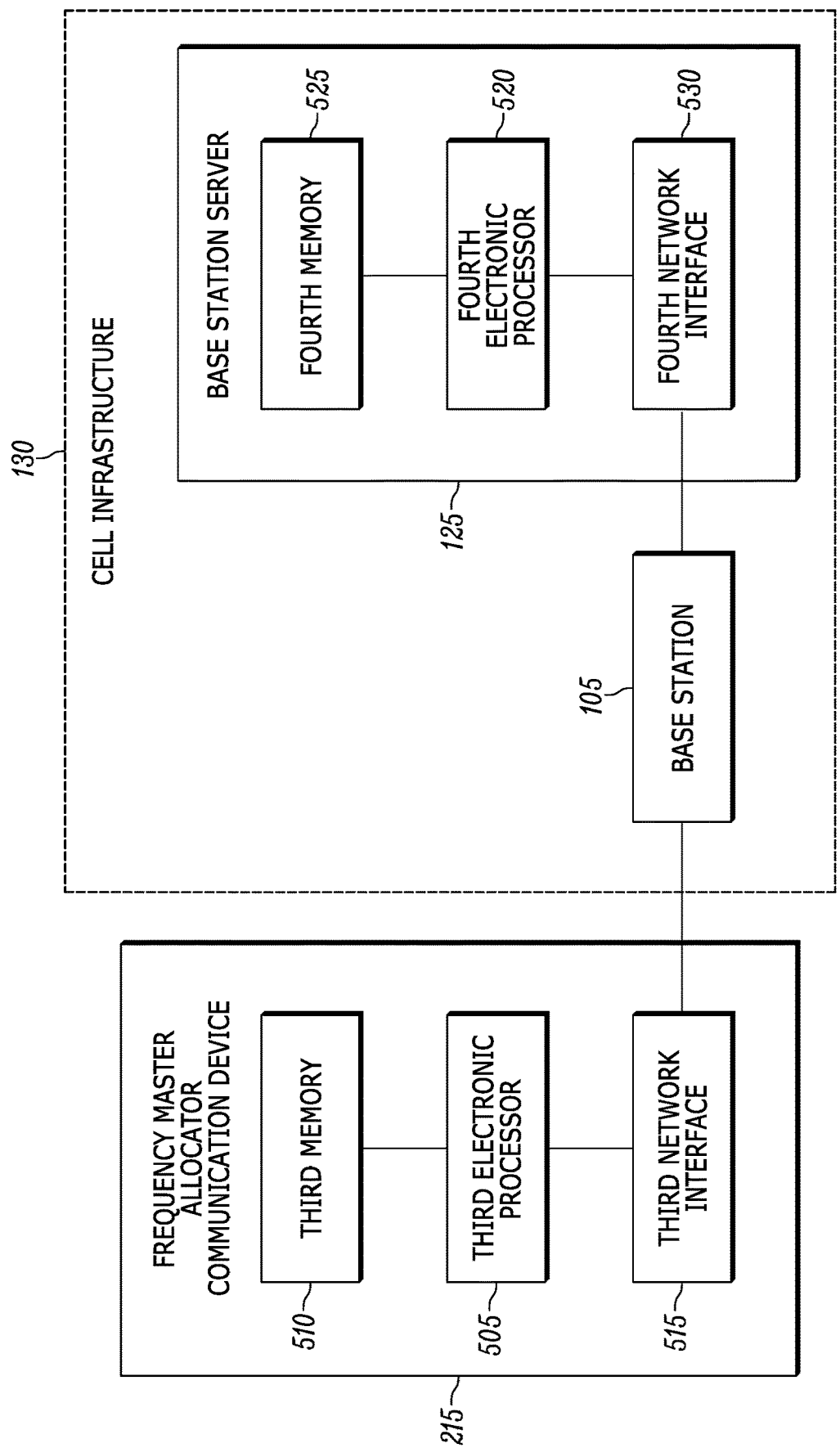
FIG. 5 is diagram of cell infrastructure and a frequency master allocator communication device of the second communication system of FIG. 2 according to one embodiment.

FIG. 5 is a diagram of the cell infrastructure 130 and the master allocator 215 of the second communication system 200 of FIG. 2. The master allocator 215 includes a third electronic processor 505, a third memory 510, and a third network interface 515. These components are similar to those described above with respect to the first transmitting communication device 115 and perform similar functions. For example, the third network interface 515 sends and receives data to and from the base station 105. For example, as mentioned previously herein, such data may be transmitted and received over a wired connection by directly conducting a radio interface (in other words, an antenna) of the third network interface 515 with a radio interface of the base station 105. In some embodiments, the master allocator 215 may include fewer or additional components in configurations different from that illustrated in FIG. 5. For example, in some embodiments, the master allocator 215 also includes at least one of a display, a microphone, and a speaker as described above with respect to the first transmitting communication device 115 of FIG. 3. In some embodiments, the master allocator 215 performs additional functionality than the functionality described below.

As shown in FIG. 5, the base station server 125 is a computer that includes a fourth electronic processor 520, a fourth memory 525, and a fourth network interface 530. These components are similar to those described above with respect to the first transmitting communication device 115 and perform similar functions. For example, the fourth electronic processor 520 may execute instructions stored in the fourth memory 525 to implement functionality of the base station server 125, such as to control the fourth network interface 530 to transmit and receive signals through the base station 105 to allocate resources or manage communication to and from communication devices in the cell 110. In some embodiments, the fourth network interface 530 is coupled via a wired connection to the base station 105 and to the third network interface 515 of the master allocator 215. In other words, the master allocator 215 communicates with the base station 105 through a wired connection as mentioned previously herein. Although FIG. 5 shows the third network interface 515 coupled via a wired connection to the base station 105 through the fourth network interface 530, in some embodiments, the third network interface 515 is directly coupled via a wired connection to the base station 105.

Although the master allocator 215 communicates with the base station 105 through a wired connection, in some embodiments, the cell infrastructure 130 is unaware that such communication is occurring over the wired connection. For example, the third electronic processor 505 of the master allocator 215 may be configured to control communication with the base station 105 through the wired connection such that the cell infrastructure 130 determines that such communication is occurring wirelessly with a communication device located in the cell 110 as explained in greater detail below.

Figure 6:
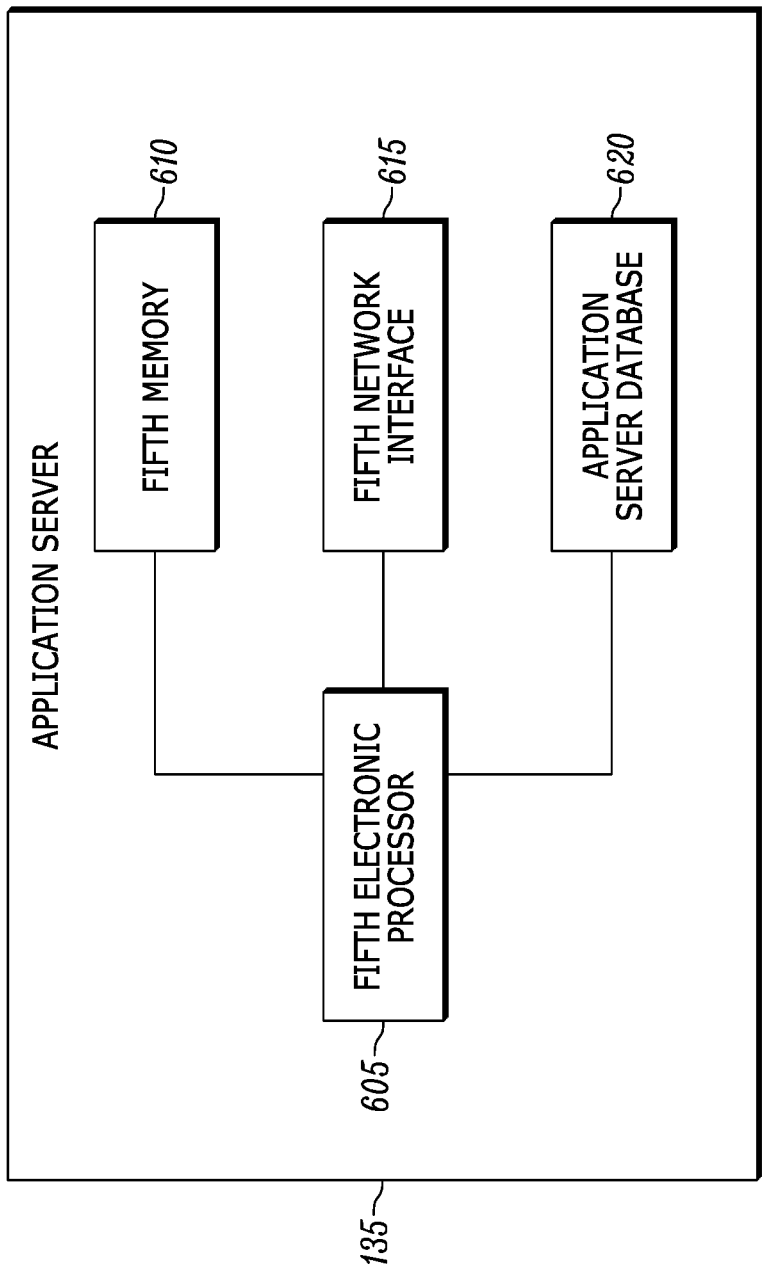
FIG. 6 is a diagram of an application server included in the communication systems of FIGS. 1 and 2 according to one embodiment.

FIG. 6 is a diagram of the application server 135 according to one embodiment. In the example illustrated, the application server 135 is a computer that includes a fifth electronic processor 605, an input/output interface (not shown), a fifth memory 610, and a fifth network interface 615. These components are similar to those described above with respect to the first transmitting communication device 115 and perform similar functions. The application server 135 also includes an application server database 620 for storing identification information of the first transmitting communication device 115 and the master allocator 215 as mentioned previously herein and as will be explained in greater detail below. In some embodiments, the application server database 620 is a separate component from the application server 135 and is coupled to the application server 135 through wired or wireless connections.

The first communication system 100 of FIG. 1 is configured to enable communications from the first transmitting communication device 115 to another device, such as the first receiving communication device 120 or a similar communication device located outside of the cell 110, where the communications are routed through the base station 105. For example, when a communication device (for example, the first transmitting communication device 115) enters the cell 110, the base station 105 allocates and provides a temporary identification to the first transmitting communication device 115. The temporary identification may be, for example, a cell radio network temporary identifier (C-RNTI). In some embodiments, the base station 105 provides the temporary identification to the first transmitting communication device 115 upon receiving a request from the first transmitting communication device 115. The first transmitting communication device 115 may be sent the temporary identification upon entering the cell 110. A communication device may enter a cell, such as the cell 110, by physically moving into the cell 110 or by being powered on within the cell 110 when previously powered off.

The temporary identification is used by the base station 105 during future communications with the first transmitting communication device 115. For example, when the first transmitting communication device 115 desires to transmit data, the first transmitting communication device 115 communicates the desire to the base station 105, for example, by requesting a resource allocation on an uplink channel. The base station 105 receives the request and recognizes the request as being sent by the first transmitting communication device 115 based on its temporary identification. The base station 105 then allocates resources on an uplink channel of the base station 105 for the first transmitting communication device 115 to transmit data. The base station 105 then sends a resource allocation message to the first transmitting communication device 115 using its temporary identification. For example, the resource allocation message may provide a frequency allocation for the uplink channel and a time allocation for the uplink channel for the first transmitting communication device 115 to use for data transmission. The first transmitting communication device 115 then transmits data in accordance with the frequency allocation and the time allocation to the base station 105. The base station 105 then forwards the data to the desired communication device (for example, the first receiving communication device 120).

The first communication system 100 of FIG. 1 is further configured to enable device-to-device communications directly from the first transmitting communication device 115 to another device within the cell 110, such as the first receiving communication device 120, where the communications are not routed through the base station 105.

Figure 7:
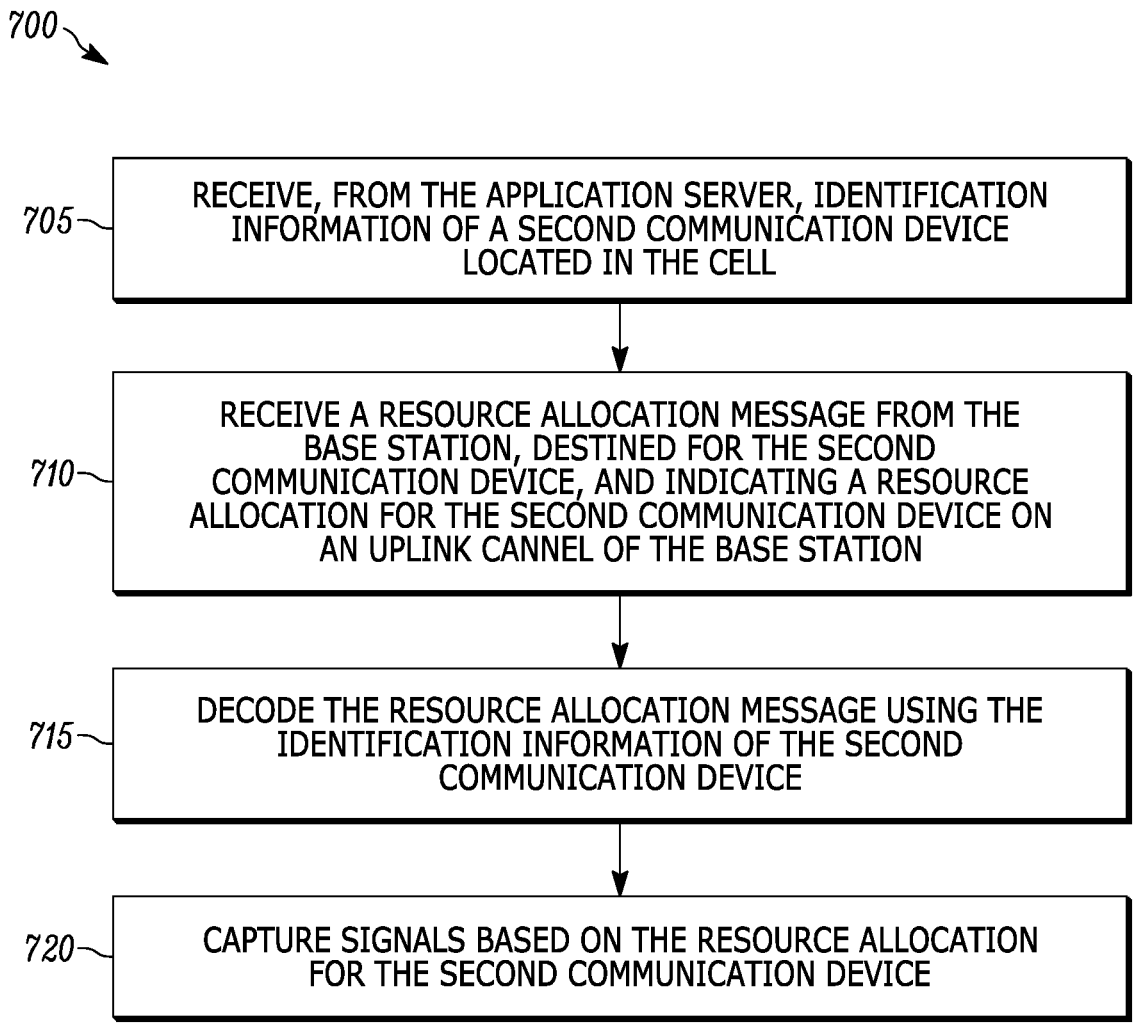
FIG. 7 is a flowchart of a method of capturing signals in accordance with allocated resources performed by a receiving communication device of the communication systems of FIGS. 1 and 2 according to one embodiment.

FIG. 7 illustrates an exemplary method 700 of capturing signals in accordance with allocated resources. The method 700 may be used for device-to-device communications between communication devices as well as for other uses. In some embodiments, the method 700 allows for direct device-to-device communication (for example, Long Term Evolution In-band Direct Mode) using legacy infrastructure (for example, legacy Long Term Evolution infrastructure) without the modifying the legacy infrastructure, for example, to support Third Generation Partnership (3GPP) release 12 or further updates. The method 700 is described as being executed by the first receiving communication device 120 with respect to the first communication system 100 of FIG. 1. However, as noted previously herein, the method 700 may also be implemented by other communication devices.

At block 705, the first receiving communication device 120 (in other words, a first communication device) receives identification information of the first transmitting communication device 115 located in the cell 110 (in other words, a second communication device) from the application server database 620 of the application server 135. The identification information is received by the second network interface 415 and includes the temporary identification of the first transmitting communication device 115.

In some embodiments, the first receiving communication device 120 receives the identification information of the first transmitting communication device 115 when the first receiving communication device 120 enters the cell 110. For example, after the first receiving communication device 120 enters the cell 110 and receives its own temporary identification from the base station 105, the first receiving communication device 120 may request and receive, from the application server 135 through the base station 105, the identification information of communication devices located within the cell 110 (including, for example, the identification information of the first transmitting communication device 115).

The application server 135 may maintain identification information for communication devices in the cell 110. For example, referring back to the first transmitting communication device 115 receiving its temporary identification from the base station 105, upon receipt of its temporary identification, the first transmitting communication device 115 sends its identification information (including its temporary identification) to the application server 135 through the base station 105. The application server 135 receives and stores the identification information of the first transmitting communication device 115 and the cell 110 in which the first transmitting communication device 115 is located in the application server database 620. In some embodiments, each communication device that enters a new cell sends its identification information to the application server 135 through the base station 105 such that the application server database 620 stores the identification information of each communication device and which cell the communication device is located in.

In addition to the temporary identification allocated by the base station 105, in some embodiments, the identification information sent by the first transmitting communication device 115 also includes at least one of the group consisting of a data content category and a data description. For example, the data content category may include information relating to the type of data that will be transmitted by the first transmitting communication device 115 (for example, video data, voice data, text data, and the like). The data description data may include information relating to the type of information provided by the data that will transmitted by the first transmitting communication device 115 (for example, a commercial advertisement from, for example, a restaurant, a store, and the like; information relating to available services in the vicinity; information relating to buildings in the vicinity, and the like). In some embodiments, the first transmitting communication device 115 transmits the data content category and the data description to the application server 135 for each data transmission intended to be made by the first transmitting communication device 115. Accordingly, other communication devices may retrieve the data content category and the data description from the application server 135 to determine whether the other communication devices will capture the data transmission from the first transmitting communication device 115 as described in greater detail below.

Returning to FIG. 7, at block 710, the second network interface 415 of the first receiving communication device 120 receives a resource allocation message from the base station 105 that was destined for the first transmitting communication device 115. In some embodiments, to receive the resource allocation message, the second electronic processor 405 of the first receiving communication device 120 selects to capture a data transmission of at least one of the communication devices located within the cell 110 based on the identification information received from the application server 135. For example, to select, the first receiving communication device 120 indicates (e.g., via the first display 320 or first speaker 330) the identity of one or more transmitting communication devices in the cell based on the identification information received from the application server 135. The first receiving communication device 120 then receives user input indicating a selection of at least one of the communication devices located within the cell 110, for example, the first transmitting communication device 115. The first receiving communication device 120, in turn, monitors communications from the base station 105 and captures the resource allocation message destined for the first transmitting communication device 115 sent by the base station 105. As explained previously herein, the base station 105 sends the resource allocation message to the first transmitting communication device 115 upon receiving a request to transmit data from the first transmitting communication device 115.

The resource allocation message sent by the base station 105 is broadcast to the communication devices located within the cell 110. The resource allocation message includes the temporary identification of the first transmitting communication device 115. The temporary identification of the first transmitting communication device 115 allows the first transmitting communication device 115 to recognize that the resource allocation message is intended for the first transmitting communication device 115. In other words, the first transmitting communication device 115 captures the resource allocation message destined for the first transmitting communication device 115 sent by the base station 105 based on the temporary identification.

The resource allocation message indicates a resource allocation for the first transmitting communication device 115 on an uplink channel of the base station 105 as explained previously herein (for example, a frequency allocation and a time allocation for the uplink channel for the first transmitting communication device 115 to use for data transmission).

At block 715, the first receiving communication device 120 decodes the resource allocation message from the base station 105 using the identification information of the first transmitting communication device 115. For example, based on the resource allocation message, the second electronic processor 405 of the first receiving communication device 120 determines the resource allocation for the first transmitting communication device 115 on an uplink channel of the base station 105. In other words, in some embodiments, the first receiving communication device 120 determines the frequency and time at which the first transmitting communication device 115 is going to transmit data.

At block 720, the second network interface 415 of the first receiving communication device 120 captures signals based on the resource allocation for the first transmitting communication device 115. For example, the first transmitting communication device 115 transmits data in accordance with the resource allocation received from the base station 105. In some embodiments, the first transmitting communication device 115 transmits data to the application server 135. In other words, the base station 105 receives the data transmission from the first transmitting communication device 115 and forwards the data transmission to the application server 135 over the network 140. The second network interface 415 of the first receiving communication device 120 captures the data transmission on route from the first transmitting communication device 115 to the base station 105 on the uplink channel and being sent in accordance with the resource allocation for the first transmitting communication device 115. By capturing this data transmission with the first receiving communication device 120, the first transmitting communication device 115 is able to communicate directly with the first receiving communication device 120.

The data transmission from the first transmitting communication device 115, although captured by the first receiving communication device 120, is destined for (for example, addressed to) the application server 135 as described previously herein. Accordingly, the base station 105 forwards the data transmission from the first transmitting communication device 115 to the application server 135. However, in some embodiments, the application server 135 discards the data received from the base station 105 because the data transmission from the first transmitting communication device 115 was intended for device-to-device communication within the cell 110. Thus, in some embodiments, the application server 135 is stand-in destination to enable, in part, the resource allocation on the uplink channel from the base station 105.

In some embodiments, the method 700 allows for less downlink resources to be used by the base station 105 while multicasting data from the first transmitting communication device 115 to communication devices within the cell 110 and within wireless communication range of the first transmitting communication device 115. For example, because the base station 105 does not forward data transmissions from the first transmitting communication device 115 to the first receiving communication devices 120, less downlink resources are used by the base station 105. Additionally, as mentioned previously herein, in some embodiments, the method 700 allows for direct device-to-device communication using legacy Long Term Evolution infrastructure without the modifying the legacy Long Term Evolution infrastructure, for example, to support Third Generation Partnership release 12 or further updates.

Although the method 700 is described with respect to the first transmitting communication device 115 and the first receiving communication device 120, in some embodiments additional communication devices (for example, a third communication device) may perform the method 700 to capture data transmissions from the first transmitting communication device 115. In other words, the cell 110 may include more than one first receiving communication device 120 that receives data transmissions from the first transmitting communication device 115.

As mentioned previously herein, in some embodiments, two or more communication devices within the cell 110 may transmit data such that each of these communication devices may be considered a broadcast station within the cell 110. In other words, the cell 110 may include more than one first transmitting communication device 115 where each first transmitting communication device 115 transmits data according to its own resource allocation received in its own resource allocation message. In accordance with the method 700, other communication devices located within the cell 110 may select to capture data transmissions sent by these communication devices (in other words, broadcast stations) using the identification information received from the application server 135 as explained previously herein. In other words, the first receiving communication device 120 may capture data transmissions from more than one first transmitting communication device 115 within the cell 110.

In some embodiments, the identification information received by the first receiving communication device 120 corresponds to other communication devices located within the cell 110 that are within a predetermined distance from the first receiving communication device 120. For example, when sending identification information to the application server 135, each communication device may provide its location information (for example, as determined by a location component on each communication device). In some embodiments, when providing identification information regarding other communication devices located in the cell 110 to the first receiving communication device 120, the application server 135 may only provide identification information of communication devices that are within a predetermined distance from the first receiving communication device 120. For example, the predetermined distance may be based on the wireless device-to-device communication range of at least one of the first receiving communication device 120 and the other communication devices within the cell 110. In some embodiments, the application server 135 provides identification information of all communication devices located in the cell 110 that includes the respective location information of each communication device. Then, the second electronic processor 405 of the first receiving communication device 120 determines which communication devices are within a predetermined distance (for example, within wireless device-to-device communication range of the first receiving communication device 120).

In some embodiments, the first receiving communication device 120 may receive identification information (including location information) from the application server 135 of communication devices located in cells adjacent to the cell 110. In such embodiments, the first receiving communication device 120 may capture data transmissions from a communication device located in an adjacent cell by executing the method 700 described previously herein. For example, such direct device-to-device communication between communication devices in adjacent cells may occur when the communication devices are located near the edge of their respective cells and are within a wireless device-to-device communication range of each other.

In some embodiments, the first transmitting communication device 115 transmits data to any communication devices that are located within the cell 110, that are located within wireless communication range of the first transmitting communication device 115, and that have selected to capture data from the first transmitting communication device 115. As an example of such an embodiment, a communication device at a restaurant (for example, a computer configured to wirelessly communicate with the base station 105) may periodically transmit data regarding the menu of the restaurant to the application server 135 through the base station 105. When another communication device (for example, first receiving communication device 120) is moved such that it is located near the communication device at the restaurant, the first receiving communication device 120 may capture the data regarding the menu as the communication device at the restaurant transmits the data to the base station 105. Such data capture may be accomplished using the method 700 described previously herein.

In such an example, identification information of the communication device at the restaurant may indicate that the data being transmitted is a commercial advertisement or that the data being transmitted is from a location that serves food. Based on the settings of the first receiving communication device 120, the second electronic processor 405 determines whether to capture the data transmission from the communication device at the restaurant. In other words, when the first receiving communication device 120 receives the identification information of the communication devices located within the cell 110 from the application server 135, the second electronic processor 405 may select to capture data transmissions of at least one of the communication devices based on the settings of the first receiving communication device 120. For example, the settings on the first receiving communication device 120 may allow for data transmissions categorized as commercial advertisements to be captured or may prevent data transmissions categorized as commercial advertisements from being captured.

In some embodiments, the identification information stored in the application server database 620 is updated when new data transmission requests are received from first transmitting communication devices 115. For example, a first transmitting communication device 115 may request to transmit a first message that includes voice data and later transmit a second message that includes video data. In some embodiments, the application server 135 communicates with the communication devices within the cell 110 to update identification information when the identification information stored in the application server database 620 is changed. In some embodiments, the communication devices located within the cell 110 periodically request identification information from the application server 135 (similar to the request for identification information upon entering the cell 110) to ensure that the communication devices include current identification information (for example, current information relating to the data content category and the data description of each first transmitting communication device 115).

In some embodiments, the first transmitting communication device 115 transmits data to a specified communication device or a specified plurality of communication devices within the cell 110 and within wireless communication range of the first transmitting communication device 115. For example, when transmitting its identification information to the application server 135, the first transmitting communication device 115 may specify the destination of its data transmission (for example, by providing an address of a specified communication device or a specified plurality of communication devices). In turn, the application server 135 only allows the specified communication device(s) to retrieve the identification information of the first transmitting communication device 115. Thus, other communication devices that the data transmission is not intended for may not be able to retrieve the identification information of the first transmitting communication device 115 and, accordingly, may not be able to capture the data transmission from the first transmitting communication device 115.

While the method 700 was described previously herein as being executed by the first receiving communication device 120 of the first communication system 100 of FIG. 1, in some embodiments, the method 700 is executed by at least one of the communication devices 205 and 210 of the second communication system 200 of FIG. 2. In such embodiments, the method 700 is executed to make frequency resources allocated by the base station 105 to the master allocator 215 available to other communication devices.

For example, some communication systems may not be capable of allocating frequency resources to be used for purposes other than communication through a base station according to a predetermined network protocol (for example, a Long Term Evolution network protocol). However, there may be situations where it may be useful to make frequency resources available within a cell for other purposes (for example, direct device-to-device communication, sensing noise, and the like).

With reference to the second communication system 200 of FIG. 2, the master allocator 215 may request and receive resources (for example, an uplink channel on a predetermined frequency) from the base station 105 in a similar manner as described above with respect to the first transmitting communication device 115. For example, the master allocator 215 may receive a temporary identification from the base station 105 to be used to receive resource allocations from the base station 105 as described previously herein with respect to the first transmitting communication device 115. Upon receipt of its temporary identification, the master allocator 215 may send its identification information (including its temporary identification) to the application server 135 through the base station 105 as described previously herein with respect to the first transmitting communication device 115. The application server 135 receives and stores the identification information of the master allocator 215 and the cell 110 in which the master allocator 215 is located in the application server database 620. In some embodiments, the identification information of the master allocator 215 indicates that the master allocator 215 is coupled via a wired connection to the base station 105.

In some embodiments, the communication between the master allocator 215 and the base station 105 occurs over a wired connection as mentioned previously herein. Because the master allocator 215 communicates via a wired connection with the base station 105, the resources allocated to the master allocator 215 by the base station 105 for wireless communication (for example, the uplink channel on the predetermined frequency) are not actually in use by the master allocator 215. Rather, as mentioned above, the third electronic processor 505 of the master allocator 215 may control communication with the base station 105 such that the cell infrastructure 130 determines that such communication is occurring wirelessly when wireless communication is not actually occurring. In other words, the cell infrastructure 130 may receive data over the wired connection that indicates to the base station 105 that the uplink channel allocated to the master allocator 215 is in use. In some embodiments, such data may not have any other use and may be forwarded to and discarded by the application server 135 as described previously herein. Accordingly, the resources allocated to the master allocator 215 may be used by other communication devices located in the cell 110 as explained in greater detail below.

For example, in some embodiments, other communication devices located within the cell 110 (for example, the communication devices 205 and 210) retrieve the identification information of the master allocator 215 stored in the application server database 620. Using such identification information, these other communication devices may be able to engage in direct device-to-device communication (for example, from the second transmitting communication device 205 to the second receiving communication device 210). As another example, using such identification information, these other communication devices use the resources allocated to the master allocator 215 for other purposes, such as to sense noise at a predetermined frequency.

Because the master allocator 215 is coupled via a wired connection to the base station 105 (for example, through mutually conducted antennas as described previously herein), its wired communication to the base station 105 on its allocated uplink channel does not interfere with wireless communications occurring at the same allocated resources between other communication devices located in the cell 110. In other words, the wired connection allows for communication between the master allocator 215 and the base station 105 to transmit at a lower power than may otherwise be used for wireless communication between the same devices in a typical wireless communication (for example, because the of the directly conducted antennas between the master allocator 215 and the base station 105). Additionally, from the perspective of the base station 105, the data received from the master allocator 215 via the wired connection masks other communications occurring at the same frequency between other communication devices located in the cell 110 because the signal strength of the wired connection is dominant when compared to wireless signals received from other communication devices.

Referring back to FIG. 7, at block 705, the second receiving communication device 210 (in other words, a first communication device) receives identification information of the master allocator 215 (in other words, a second communication device) from the application server database 620 of the application server 135. The identification information is received by a network interface of the second receiving communication device 210 and includes the temporary identification of the master allocator 215 as described previously herein. The identification information also indicates that the master allocator 215 is coupled to the base station 105 via a wired connection.

In some embodiments, the second receiving communication device 210 receives the identification information when it enters the cell 110 as described previously herein with respect to the first receiving communication device 120.

At block 710, the network interface of the second receiving communication device 210 receives a resource allocation message from the base station 105 that was destined for the master allocator 215. For example, as explained previously herein, the base station 105 sends the resource allocation message to the master allocator 215 upon receiving a request to transmit data from the master allocator 215. In doing so, the base station 105 broadcasts the resource allocation message to the communication devices located within the cell 110 despite the master allocator 215 being coupled via a wired connection to the base station 105 (because the base station 105 is unaware that the master allocator 215 is coupled via a wired connection as explained previously herein).

The resource allocation message includes the temporary identification of the master allocator 215. The temporary identification of the master allocator 215 allows the master allocator 215 to recognize that the resource allocation message is intended for the master allocator 215. The resource allocation message indicates a resource allocation for the master allocator 215 on an uplink channel of the base station 105 as explained previously herein (for example, a frequency allocation and a time allocation for the uplink channel for the master allocator 215 to use for data transmission).

As described previously herein (at block 705), the second receiving communication device 210 has previously received the identification information of the master allocator 215 (including its temporary identification) from the application server 135. Accordingly, at block 715, the second receiving communication device 210 decodes the resource allocation message from the base station 105 using the identification information of the master allocator 215. For example, based on the resource allocation message, an electronic processor of the second receiving communication device 210 may determine the resource allocation for the master allocator 215 on an uplink channel of the base station 105. In other words, the second receiving communication device 210 determines when the base station 105 has allocated the master allocator 215 to transmit data and on which frequency the base station 105 has allocated the master allocator 215 to transmit data.

At block 720, the network interface of the second receiving communication device 210 captures signals based on the resource allocation for the master allocator 215. For example, the master allocator 215 transmits data to the base station 105 via a wired connection such that the base station 105 determines that the uplink channel allocated to the master allocator 215 is in use. However, as explained previously herein, the uplink channel is not actually in use by the master allocator 215 because the data is transmitted to the base station 105 via a wired connection. Thus, the resources allocated to the master allocator 215 are available for use by other communication devices located in the cell 110. The other communication devices located in the cell 110 (for example, the second receiving communication device 210) are aware that these resources are available based on the identification information of the master allocator 215 received from the application server 135 (for example, that indicates the master allocator 215 is coupled to the base station 105 via a wired connection).

As an example of the second receiving communication device 210 capturing signals based on the resource allocation for the master allocator 215, the network interface of the second receiving communication device 210 may sense noise at a frequency allocated to the master allocator 215. In some embodiments, such noise may be sensed by the second receiving communication device 210 to detect an incumbent system that may be using the frequency allocated to the master allocator 215. In some embodiments, such noise may be sensed to detect jamming of the frequency allocated to the master allocator 215. For example, noise sensed by the second receiving communication device 210 may be compared to a predetermined signal strength threshold to determine whether an incumbent system is present or whether jamming is occurring.

As another example of the second receiving communication device 210 capturing signals based on the resource allocation for the master allocator 215, the second receiving communication device 210 may receive a data transmission from another communication device (for example, the second transmitting communication device 205). In this example, the communication devices 205 and 210 engage in device-to-device communication over the frequency allocated to the master allocator 215 (because this frequency is known to be available). In this example, the second transmitting communication device 205 may execute blocks 705, 710, and 715 to determine the frequency allocated to the master allocator 215. In this example, the device-to-device communication between the communication device 205 and 210 may occur according to a different communications protocol than is used by communication devices 205 and 210 to communicate through the base station 105. For example, the device-to-device communication between the communication devices 205 and 210 may be a non-Long Term Evolution communication type (for example, short data services and signals using, for example, WiFi, Terrestrial Trunked Radio (TETRA) direct mode, Bluetooth™, radar beacons, and the like) even though Long Term Evolution in-band resources are made available by the master allocator 215 communicating with the base station 105 via a wired connection.

In some embodiments, the resources made available by the master allocator 215 communicating with the base station 105 via a wired connection may facilitate use by other applications (for example, fifth generation (5G) wireless communication systems).

Although the method 700 is described with respect to the communication devices 205 and 210, in some embodiments additional communication devices (for example, a third communication device of the second communication system 200) may perform the method 700 to capture signals on an available frequency based on the resource allocation for the master allocator 215.

In the embodiment described previously herein with respect to the second communication system 200 of FIG. 2, the method 700 allows for frequency resources in a coverage area of the cell 110 to be made available (in other words, allocated) for purposes other than communication through the base station 105 according to a predetermined network protocol. Such frequency allocation according to this embodiment may be referred to as non-persistent frequency allocation because the base station 105 may allocate different resources for each data transmission request transmitted by the master allocator 215 (for example, using the temporary identification as described previously herein). However, in some embodiments, a persistent frequency allocation may be requested by the master allocator 215. For example, the persistent frequency allocation may be requested to reduce overhead by allowing the base station 105 to allocate a single frequency for a period of time as opposed to re-allocating frequencies many times within the same period of time.

Figure 8:
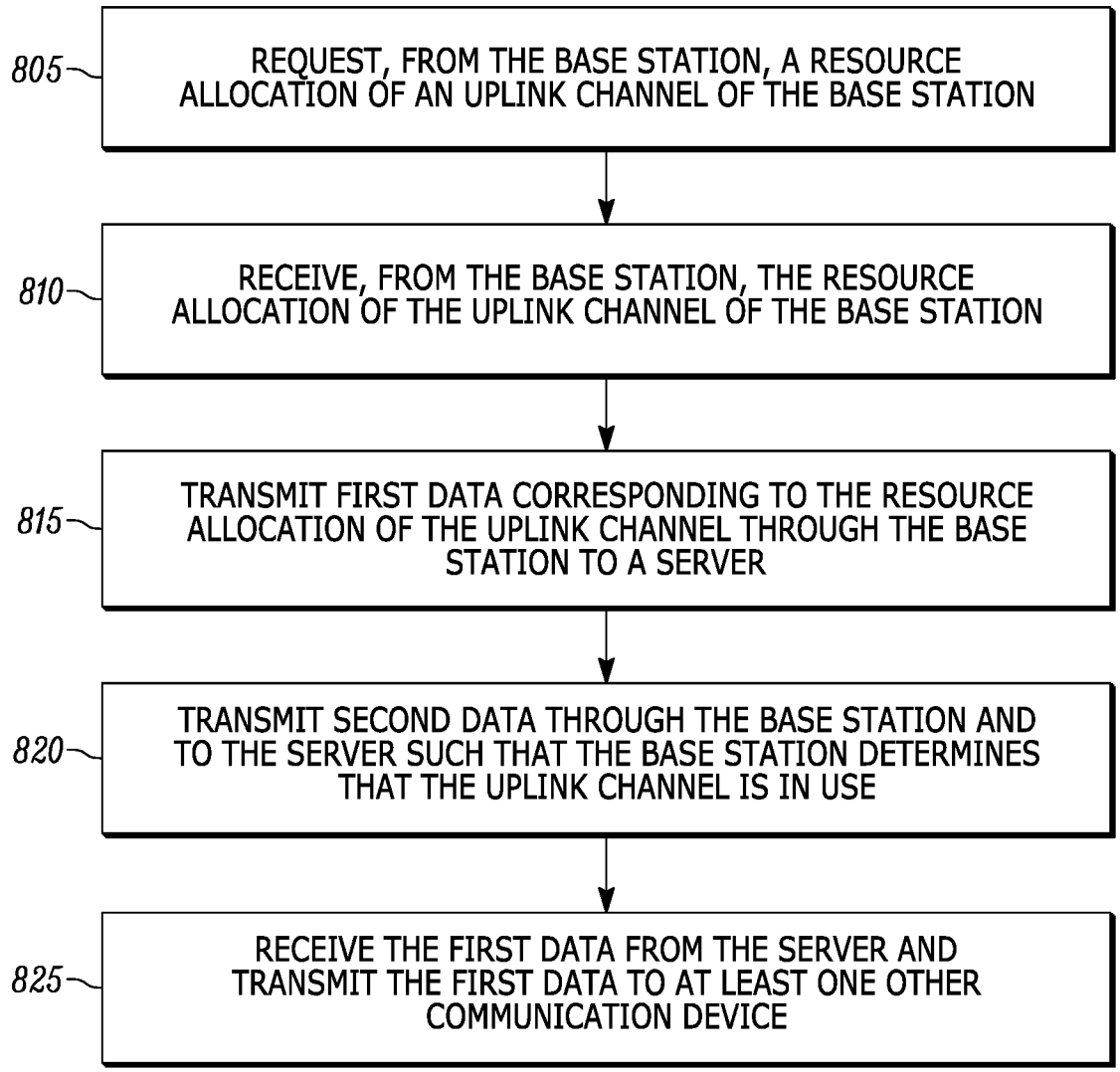
FIG. 8 is a flowchart of a method of providing a persistent frequency allocation executed by the frequency master allocator communication device and the base station of the second communication system of FIG. 2.

FIG. 8 is a flowchart of a method 800 executed by the master allocator 215 and the base station 105 of the second communication system 200 of FIG. 2. The method 800 allows the cell infrastructure 130 to provide a persistent frequency allocation that may be used by communication devices within the cell 110 for purposes other than communication through the base station 105 according to a predetermined network protocol as mentioned previously herein. For example, in embodiments in which legacy infrastructure implements Long Term Evolution communication, the method 800 allows for device-to-device communication using communication types that may not be Long Term Evolution Third Generation Partnership compliant to be implemented using Long Term Evolution in-band resources of the cell infrastructure 130.

At block 805, the master allocator 215 requests, from the base station 105, a resource allocation of an uplink channel of the base station 105 as described previously herein (for example, via the third network interface 515 through a wired connection to the base station 105). In some embodiments, the master allocator 215 requests a persistent resource allocation. For example, the master allocator 215 may request resources from the base station 105 such that the base station 105 determines that the master allocator 215 desires to transmit voice data (for example, make a call to another communication device). Based on determining that the master allocator 215 desires to transmit voice data, the base station 105 determines that the master allocator 215 is requesting a persistent resource allocation.

At block 810, the master allocator 215 receives, from the base station 105, the resource allocation of the uplink channel of the base station 105. For example, the master allocator 215 receives a persistent resource allocation that allocates a frequency for a period of time to allow the master allocator 215 to transmit voice data.

At block 815, the master allocator 215 transmits first data corresponding to the resource allocation of the uplink channel through the base station 105 to the application server 135. The application server 135 stores the first data as described previously herein with respect to the identification information of communication devices. As mentioned previously herein, the first data may indicate that the master allocator 215 is coupled to the base station 105 via a wired connection.

At block 820, the master allocator 215 transmits second data through the base station 105 to the application server 135 such that the base station 105 determines that the uplink channel allocated to the master allocator 215 is in use. However, as explained previously herein, the uplink channel is not actually in use because the second data is transmitted to the base station 105 via a wired connection. In some embodiments, the second data is discarded by the application server 135 when received from the base station 105.

Because the allocated uplink channel of the master allocator 215 is not actually in use by the master allocator 215, it may be used by other communication devices. At block 825, the base station 105 receives the first data from the application server 135 and transmits the first data to at least one other communication device located in the cell 110 (for example, the second receiving communication device 210). In some embodiments, the base station 105 may receive a request for the first data from the at least one other communication device (for example, when the at least one other communication device enters the cell 110 as described previously herein with respect to the first receiving communication device 120).

When the at least one other communication device receives the first data corresponding to the resource allocation of the master allocator 215, the at least one other communication device may capture signals based on the resource allocation corresponding to the first data. For example, as described previously herein, the at least one other communication device may sense noise at a frequency allocated to the master allocator 215. Also as described previously herein, other communication devices (for example, the communication devices 205 and 210) may engage in device-to-device communication. In some embodiments, multiple communication devices in the cell 110 may use the frequency allocated to the master allocator 215 in a similar manner as described previously herein with respect to the second receiving communication device 210.

Although the method 800 is described with respect to an uplink channel of the base station 105 for communication from the master allocator 215 to the base station 105, in some embodiments, a downlink channel of the base station 105 for communication from the base station 105 to the master allocator 215 also may be made available to be used by other communication devices in the cell 110. For example, the base station 105 may transmit a resource allocation message to the master allocator 215 that indicates a resource allocation for the master allocator 215 on an downlink channel of the base station 105 in a similar manner as explained previously herein with respect to an uplink channel. In some embodiments, the base station 105 may transmit such a resource allocation message in response to the application server 135 requesting to transmit data to the master allocator 215. In turn, the master allocator 215 may transmit the resource allocation information of the downlink channel back to the application server 135 in a similar manner as explained previously herein with respect to the resource allocation information of the uplink channel. For example, such information may indicate that the downlink channel is available because the base station 105 communicates with master allocator 215 over a wired connection. Accordingly, other communication devices may retrieve the resource allocation information of the downlink channel and use the resources as described previously herein (for example, for sensing noise, for direct device-to-device communication, and the like).

In some embodiments, the application server 135 transmits data to the master allocator 215 through the base station 105 such that the base station 105 determines that the downlink channel allocated to the master allocator 215 is in use. However, as explained previously herein with respect to the uplink channel, the downlink channel is not actually in use because the data is transmitted from the base station 105 to the master allocator 215 via a wired connection (for example, via mutually conducted antennas). In some embodiments, the master allocator 215 may discard the data received from the application server 135 through the base station 105.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of capturing signals in accordance with allocated resources, the method comprising:
receiving, from a server via a network interface of a first communication device located in a cell, identification information of a second communication device located in the cell;
receiving a user input at the first communication device, the user input indicating a selection to capture a data transmission from the second communication device;

receiving, from a base station via the network interface of the first communication device, a resource allocation message destined for the second communication device, the resource allocation message indicating a resource allocation for the second communication device on an uplink channel of the base station;

decoding, via an electronic processor of the first communication device, the resource allocation message using the identification information of the second communication device;

capturing, via the network interface of the first communication device, the data transmission addressed to be received by the base station and transmitted by the second communication device directly to the base station on the uplink channel, the data transmission sent in accordance with the resource allocation for the second communication device; and capturing, via the network interface of the first communication device, signals based on the resource allocation for the second communication device including sensing noise to detect an incumbent system using the resource allocation, to detect a jamming of a frequency allocated by the resource allocation, or to detect both the incumbent system using the resource allocation and the jamming of the frequency allocated by the resource allocation.

2. The method of claim 1, further comprising:
receiving, from the server via the network interface of the first communication device, identification information of at least one other communication device located in the cell; and outputting, with the first communication device, identities of the second communication device and the at least one other communication device based on the identification information of the second communication device and the identification information of the at least one other communication device, wherein the identities are selectable via the user input.

3. The method of claim 2, further comprising:
receiving a second user input at the first communication device, the second user input indicating a second selection to capture a second data transmission from the at least one other communication device;

receiving, from the base station via the network interface of the first communication device, a second resource allocation message destined for the at least one other communication device, the second resource allocation message indicating a second resource allocation for the at least one other communication device on the uplink channel of the base station;

decoding, via the electronic processor of the first communication device, the second resource allocation message using the identification information of the at least one other communication device; and capturing, via the network interface of the first communication device, the second data transmission addressed to be received by the base station and transmitted by the at least one other communication device directly to the base station on the uplink channel, the second data transmission sent in accordance with the second resource allocation for the at least one other communication device.

4. The method of claim 1, further comprising capturing, via the network interface of the first communication device, signals based on the resource allocation for the second communication device including capturing a second data transmission from a third communication device, the second data transmission sent in accordance with the resource allocation for the second communication device.

5. The method of claim 1, further comprising requesting, via the first communication device from the server, identification information of at least one of the group consisting of transmitting communication devices located within the cell and a frequency master allocator communication device coupled to the base station.

6. The method of claim 1, further comprising:
receiving, from the server via a second network interface of a third communication device located in the cell, the identification information of the second communication device;

receiving, from the base station via the second network interface of the third communication device, the resource allocation message destined for the second communication device, the resource allocation message indicating the resource allocation for the second communication device on the uplink channel of the base station;

decoding, via a second electronic processor of the third communication device, the resource allocation message using the identification information of the second communication device; and capturing, via the second network interface of the third communication device, signals based on the resource allocation for the second communication device.

7. The method of claim 1, wherein capturing the data transmission includes direct communication of the data transmission from the second communication device to the first communication device over resources allocated by the base station according to the resource allocation for the second communication device; and wherein the base station is configured to not be aware that the first communication device and the second communication device are capable of communicating with each other directly without the data transmission being transmitted through the base station before being transmitted to the first communication device.

8. A method of capturing signals in accordance with allocated resources, the method comprising:
receiving, from a server via a network interface of a first communication device located in a cell, identification information of a second communication device located in the cell;

receiving a user input at the first communication device, the user input indicating a selection to capture a data transmission from the second communication device;

receiving, from a base station via the network interface of the first communication device, a resource allocation message destined for the second communication device, the resource allocation message indicating a resource allocation for the second communication device on an uplink channel of the base station;

decoding, via an electronic processor of the first communication device, the resource allocation message using the identification information of the second communication device; and capturing, via the network interface of the first communication device, the data transmission addressed to be received by the base station and transmitted by the second communication device directly to the base station on the uplink channel, the data transmission sent in accordance with the resource allocation for the second communication device;

wherein receiving, from the server via the network interface of the first communication device located in the cell, the identification information of the second communication device located in the cell includes receiving, from the server via the network interface of the first communication device located in the cell, the identification information of the second communication device located in the cell, the second communication device coupled via a wired connection to the base station.

9. A first communication device located in a cell, the first communication device comprising:
   an electronic processor; and
   a network interface; wherein the first communication device is configured to
      receive, from a server via the network interface, identification information of a second communication device located in the cell,
      receive a user input at the first communication device, the user input indicating a selection to capture a data transmission from the second communication device,
      receive, from a base station via the network interface, a resource allocation message destined for the second communication device, wherein the resource allocation message indicates a resource allocation for the second communication device on an uplink channel of the base station,
      decode, with the electronic processor, the resource allocation message using the identification information of the second communication device,
      capture, via the network interface, the data transmission addressed to be received by the base station and transmitted by the second communication device directly to the base station on the uplink channel, the data transmission sent in accordance with the resource allocation for the second communication device, and
      capture, via the network interface, signals based on the resource allocation for the second communication device including sensing noise to detect an incumbent system using the resource allocation, to detect a jamming of a frequency allocated by the resource allocation, or to detect both the incumbent system using the resource allocation and the jamming of the frequency allocated by the resource allocation.

10. The first communication device of claim 9, wherein the network interface receives, from the server, identification information of at least one other communication device located in the cell; and
the first communication device outputs identities of the second communication device and the at least one other communication device based on the identification information of the second communication device and the identification information of the at least one other communication device, wherein the identities are selectable via the user input.

11. The first communication device of claim 10, wherein the first communication device is configured to receive a second user input indicating a second selection to capture a second data transmission from the at least one other communication device, and wherein the network interface is further configured to
      receive, from the base station, a second resource allocation message destined for the at least one other communication device, wherein the second resource allocation message indicates a second resource allocation for the at least one other communication device on the uplink channel of the base station and is decoded by the electronic processor using the identification information of the at least one other communication device; and
   capture the second data transmission on route from the at least one other communication device addressed to be received by the base station and transmitted by the at least one other communication device directly to the base station on the uplink channel, the second data transmission sent in accordance with the second resource allocation for the at least one other communication device.

12. The first communication device of claim 9, wherein the first communication device is configured to capture a data transmission from a third communication device, wherein the data transmission is sent in accordance with the resource allocation for the second communication device.

13. The first communication device of claim 9, wherein the electronic processor sends a request, using the network interface to the server, for identification information of at least one of the group consisting of transmitting communication devices located within the cell and a frequency master allocator communication device coupled to the base station.

14. The first communication device of claim 9, wherein the first communication device is configured to capture the data transmission by capturing direct communication of the data transmission from the second communication device to the first communication device over resources allocated by the base station according to the resource allocation for the second communication device; and
   wherein the base station is configured to not be aware that the first communication device and the second communication device are capable of communicating with each other directly without the data transmission being transmitted through the base station before being transmitted to the first communication device.

15. A first communication device located in a cell, the first communication device comprising:
   an electronic processor; and
   a network interface; wherein the first communication device is configured to
      receive, from a server via the network interface, identification information of a second communication device located in the cell, wherein the second communication device is coupled via a wired connection to the base station,
      receive a user input at the first communication device, the user input indicating a selection to capture a data transmission from the second communication device,
      receive, from a base station via the network interface, a resource allocation message destined for the second communication device, wherein the resource allocation message indicates a resource allocation for the second communication device on an uplink channel of the base station,
      decode, with the electronic processor, the resource allocation message using the identification information of the second communication device, and
      capture, via the network interface, the data transmission addressed to be received by the base station and transmitted by the second communication device directly to the base station on the uplink channel, the data transmission sent in accordance with the resource allocation for the second communication device.

* * * * *